US008508282B2

(12) United States Patent
Sicard

(10) Patent No.: US 8,508,282 B2
(45) Date of Patent: Aug. 13, 2013

(54) LIN BUS NETWORK, INTEGRATED CIRCUIT AND METHOD OF COMMUNICATING THEREON

(75) Inventor: Thierry Sicard, Tournefeuille (FR)

(73) Assignee: Freescale Semiconductor, Inc., Austin, TX (US)

( * ) Notice: Subject to any disclaimer, the term of this patent is extended or adjusted under 35 U.S.C. 154(b) by 1322 days.

(21) Appl. No.: 12/278,484

(22) PCT Filed: Feb. 9, 2006

(86) PCT No.: PCT/EP2006/001302
§ 371 (c)(1),
(2), (4) Date: Aug. 6, 2008

(87) PCT Pub. No.: WO2007/090430
PCT Pub. Date: Aug. 16, 2007

(65) Prior Publication Data
US 2009/0029656 A1      Jan. 29, 2009

(51) Int. Cl.
*H03K 17/687*         (2006.01)
(52) U.S. Cl.
USPC .......................................... 327/434
(58) Field of Classification Search
None
See application file for complete search history.

(56) References Cited

U.S. PATENT DOCUMENTS

| | | | | |
|---|---|---|---|---|
| 6,154,086 | A * | 11/2000 | Manolescu | 327/419 |
| 6,803,790 | B2 * | 10/2004 | Haycock et al. | 326/82 |
| 6,949,963 | B2 * | 9/2005 | De Haas et al. | 327/108 |
| 6,959,014 | B2 | 10/2005 | Pohlmeyer et al. | |
| 7,352,216 | B2 * | 4/2008 | Hershbarger | 327/132 |
| 7,688,113 | B2 * | 3/2010 | Nascimento et al. | 326/82 |
| 8,040,160 | B2 * | 10/2011 | Avalur | 327/108 |
| 2002/0154651 | A1 | 10/2002 | De Haas et al. | |
| 2006/0181303 | A1 * | 8/2006 | Dreps et al. | 326/29 |
| 2009/0115462 | A9 * | 5/2009 | Redoute et al. | 327/108 |

FOREIGN PATENT DOCUMENTS

| | | |
|---|---|---|
| DE | 4421083 A1 | 12/1995 |
| EP | 1404078 A | 3/2004 |
| EP | 1145370 A1 | 10/2004 |
| JP | 03253139 A | 2/1992 |
| WO | 9534152 A1 | 12/1995 |

OTHER PUBLICATIONS

EPC Application 06723037.5-2416, Office Action—Rejection, dated Jun. 3, 2009.
PCT Application No. PCT/EP2006/001302 International Search Report and Written Opinion dated Jul. 7, 2006.
Marsh; "LIN simplifies and standardizes in-vehicle networks"; www.edn.com/article/CA499208.html.

* cited by examiner

*Primary Examiner* — Lincoln Donovan
*Assistant Examiner* — Khareem E Almo

(57) ABSTRACT

A LIN network comprises a transmit driver and a receive comparator for communicating low frequency signals on a single communication bus. The transmit driver is operably coupled to a high frequency detector to detect a high frequency component on the low frequency signal. In response to detecting the high frequency component the LIN network is arranged to perform one or both of the following: route the low frequency signal having a high frequency component through a low pass filter; and/or bypass the low frequency signal having a high frequency component from passing through an active device operably coupled between the transmit driver and the single communication bus.

18 Claims, 6 Drawing Sheets

LIN BUS NETWORK, INTEGRATED CIRCUIT AND METHOD OF COMMUNICATING THEREON

FIELD OF THE INVENTION

One embodiment of the present invention relates to a single-wire serial communication protocol based on the common serial communication interface (SCI). The invention is applicable to, but not limited to, a mechanism and method to improve electro magnetic susceptibility in a linear Interconnect Network (LIN).

BACKGROUND OF THE INVENTION

Linear Interconnect Networking (LIN) is an industry standard for a single-wire serial communication protocol, based on the common serial communication interface (SCI) (UART) byte-word interface. UART interfaces are now available as a low cost silicon module and are provided as a feature on the majority of micro-controllers. UART interfaces can take many forms, for example they can be implemented in software or as a state machine interface for application specific integrated circuits (ASICs).

LIN is targeted as an easy to use, open, communication standard, designed to provide more reliable vehicle diagnostics. Access to the communication medium in a LIN network is controlled by a master node, so that no arbitration or collision management software or control is required in the slave nodes, thus providing a guarantee of worst-case latency times for signal transmission.

A node in a LIN network does not make use of any information about the system configuration, except for the denomination of the master node. Nodes can be added to the LIN network without requiring hardware or software changes in other slave nodes. The size of a LIN network is typically under twelve nodes, although the LIN network is not generally restricted to twelve nodes. This results from a use of only '64' identifiers together with a relatively low transmission speed of 20 Kbits/sec. The clock synchronization, the simplicity of UART communication, and the single-wire medium are often cited as major factors for the cost efficiency of LIN.

Referring now to FIG. 1, a simplified LIN node 100 is illustrated. FIG. 1 shows the basic block diagram of the LIN physical layer. A digital input, referred to as txd 105, drives the transmit (Tx) LIN bus driver 110. When the digital input txd 105 is at high logic level, the LIN output, on the single communication line LIN communication bus 115, is at a high level, i.e. the supply voltage of the vehicle battery referred to as $V_{bat}$.

The signal voltage swing on the single communication LIN bus swings from $V_{bat}$ to a low level of approximately 1V. The Tx LIN bus driver 110 is supplied by $V_{bat}$. Each receiver element in a LIN network comprises a comparator 120, which detects when the voltage signal on the single communication LIN bus crosses a value of 50% of $V_{bat}$. The voltage level of the comparator output is therefore controlled by the reference signal 125 input to the comparator 120. When the voltage on the single communication LIN bus is high, i.e. over a level of 50% of $V_{bat}$, the receiver logic (rxd) output 130 is at a high ($V_{bat}$) logic level.

Referring now to FIG. 2, A LIN network 200 is illustrated. The LIN network 200 comprises one master node (control unit) 205 and one or more slave nodes 220, 230. All nodes include a slave communication task 215, 225, 235 that is divided between a transmit task and a receive task. The master node 205 also includes a transmit task 210 and a receive slave task 215. Communication in an active LIN network is performed on the LIN bus 240 and is always initiated by a master task 210.

Referring now to FIG. 3, the simplified circuit of a node is illustrated. FIG. 3 illustrates the output stage of the Tx bus driver 110. The output stage is connected to $V_{bat}$ 305 through a diode 310. A resistive load 315 is used as a pull-up function for the output stage, i.e. the single LIN communication bus 115. A typical value for a resistive load 315 of a slave device is 30 Kohm. Thus, the 30 Kohms pull-up resistor is present in each internal LIN node. However, to distinguish the Master node from a slave node a 1 KOhms resistor is placed in series with another diode, and is located outside of the integrated circuit. The transistor 320 functions as a switch, through control of the serial communication interface (SCI) 330, and is therefore able to pull-down the single communication LIN bus 115 to a low level.

However, it has been recognised that when Electro Magnetic Interference (EMI) occurs on the single communication LIN bus 115, via introduction of high frequency component interference, say from a circuit or device operational in the vehicle, the LIN network may fail the Direct Power Injection (DPI) test. In particular, there exists a need to sustain 36 dBm in DPI test (+/−40V on single communication LIN bus 115) with a low transition time between the communication signal transitioning between high and low voltage levels.

Thus, a need exists for an improved LIN network, integrated circuit and method of operation therefor.

SUMMARY OF THE INVENTION

In accordance with aspects of the present invention, there is provided a LIN network, an integrated circuit and method of operation therefor, as defined in the appended Claims.

Figure 1:
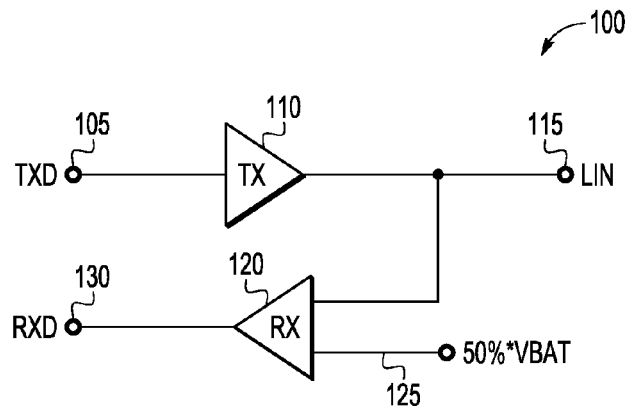
FIG. 1 illustrates a known simplified circuit diagram of a LIN node.
Figure 2:
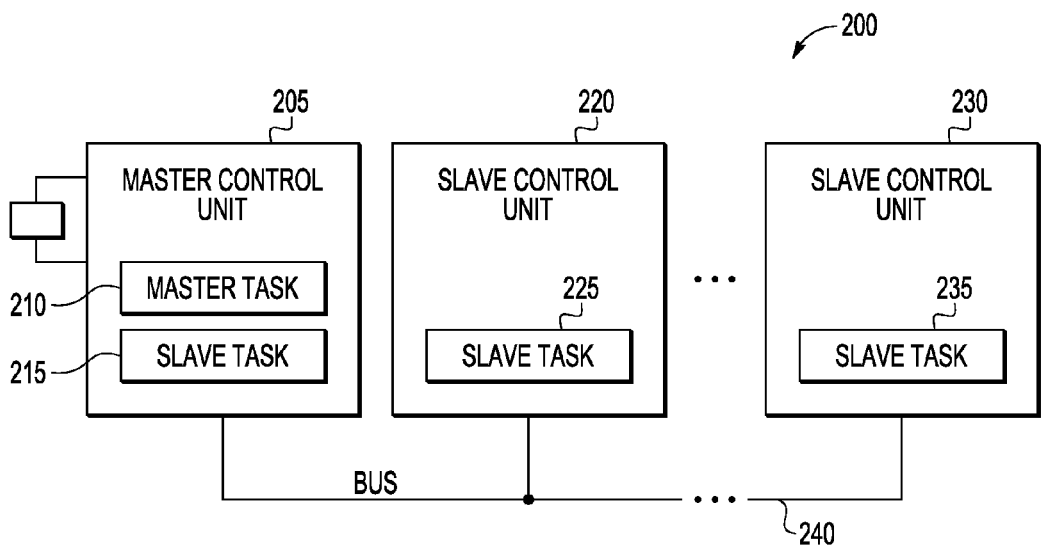
FIG. 2 illustrates an overview of a known LIN network.
Figure 3:
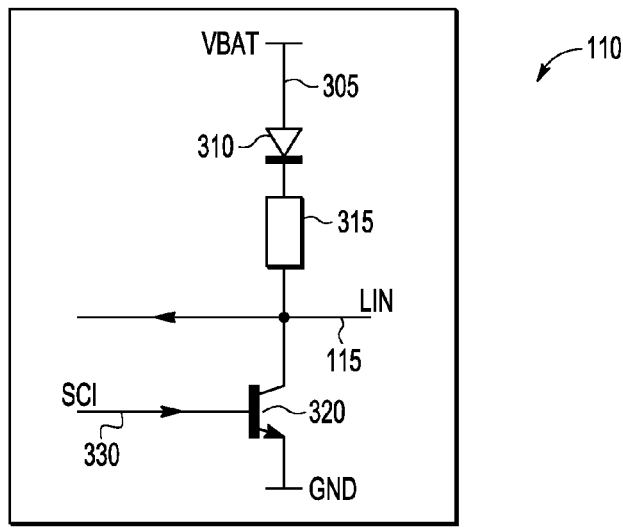
FIG. 3 illustrates a known transmit driver circuit employed in a LIN network.
Figure 4:
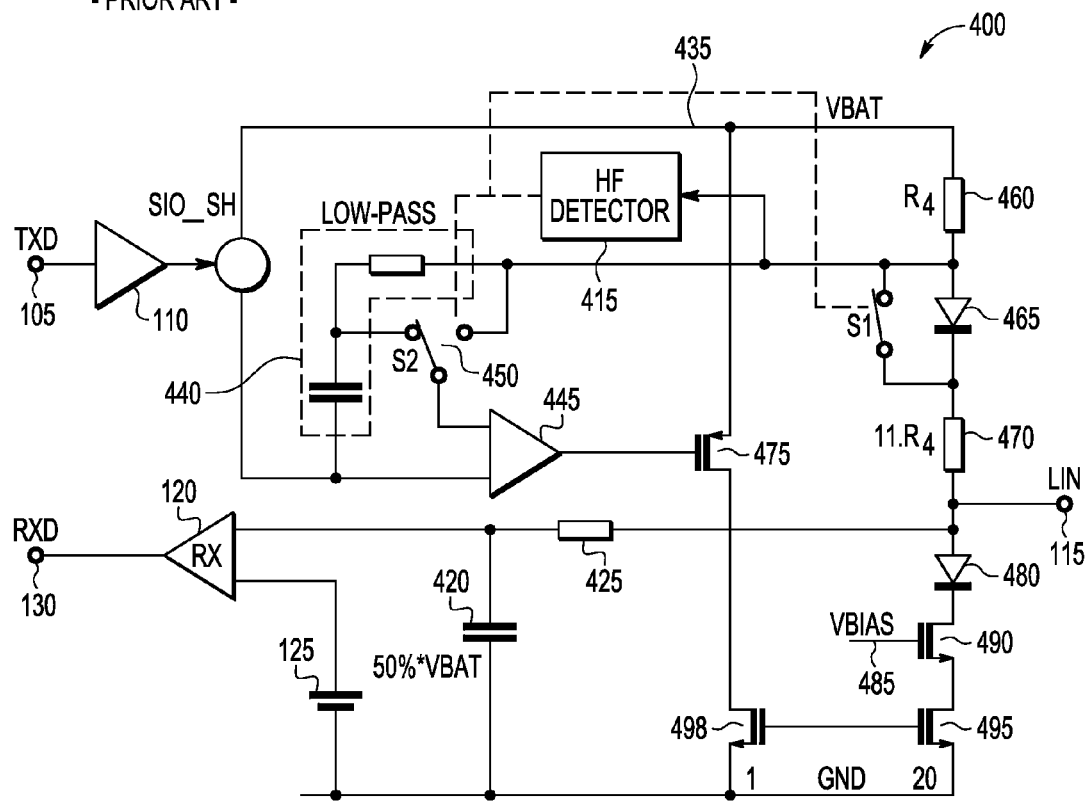
Figure 5:
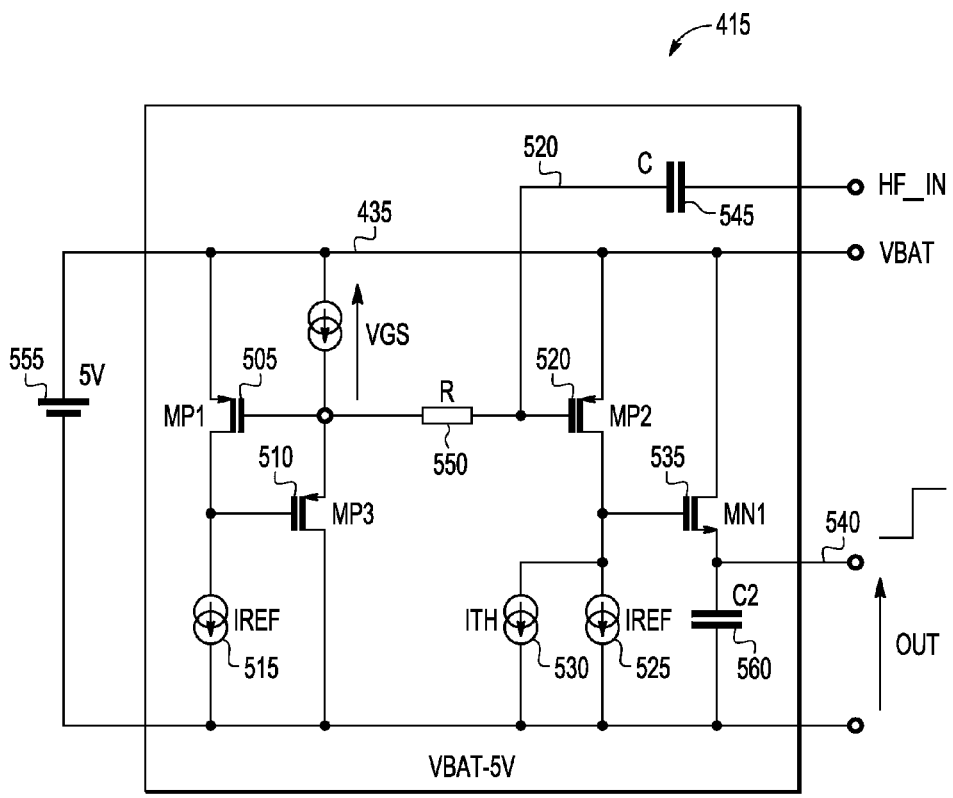
Figure 6:
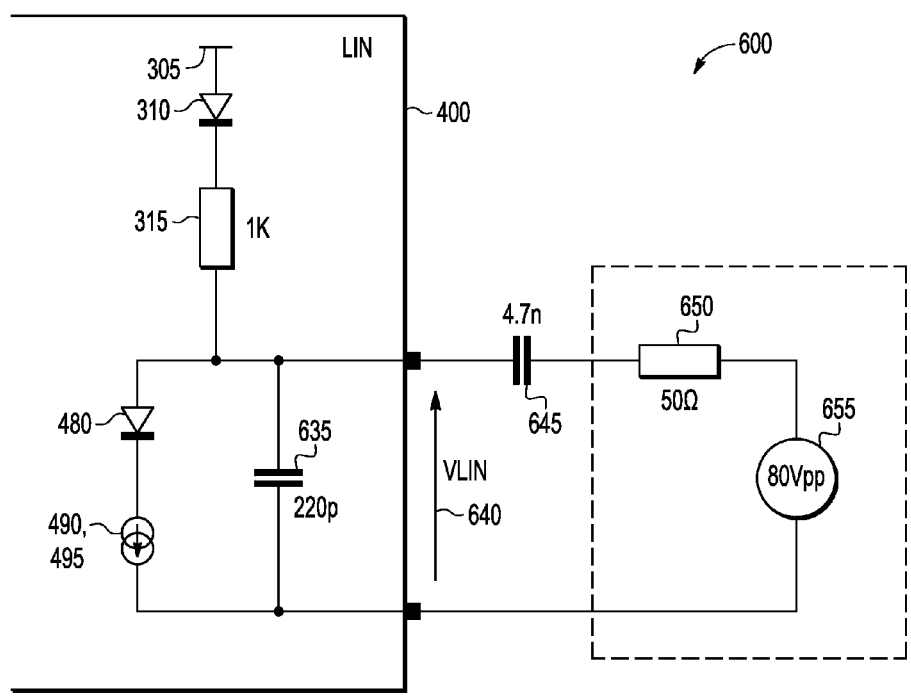
Figure 7:
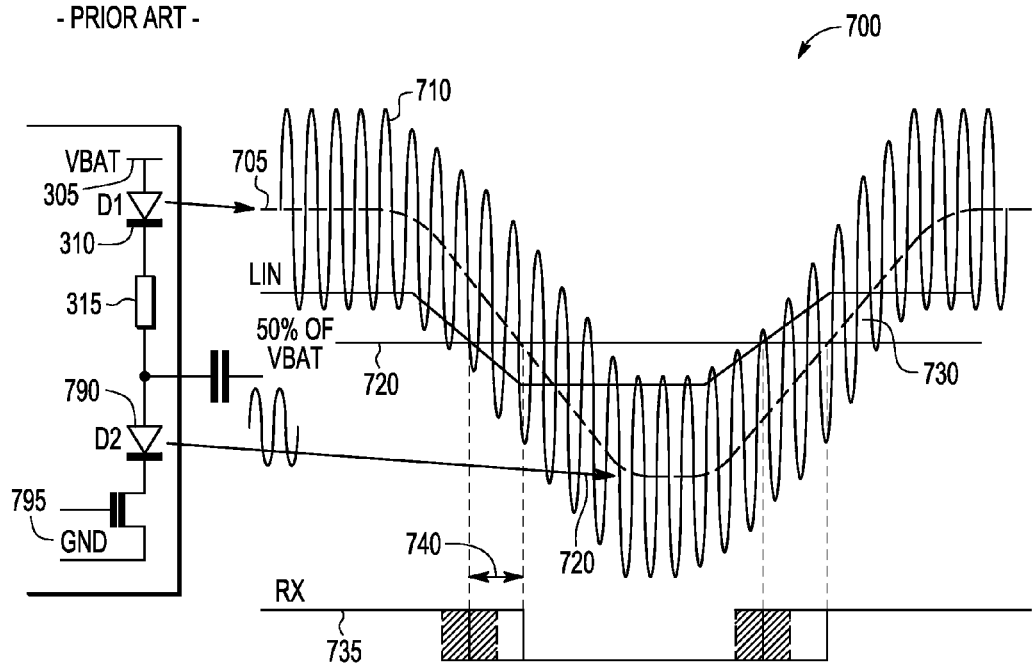
Figure 8:
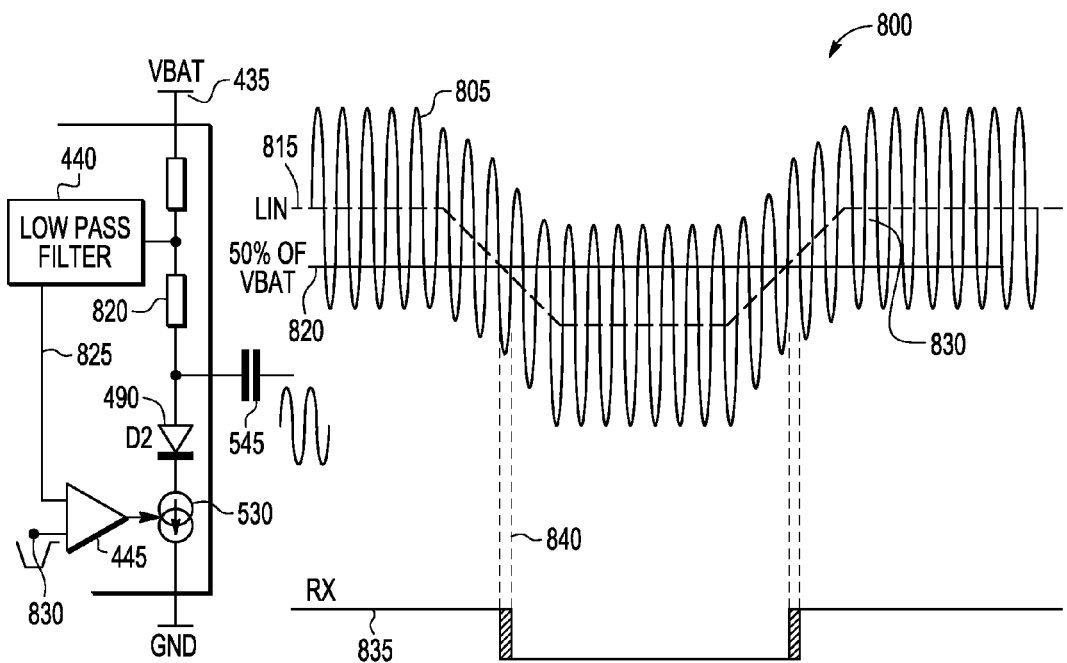
Figure 9:
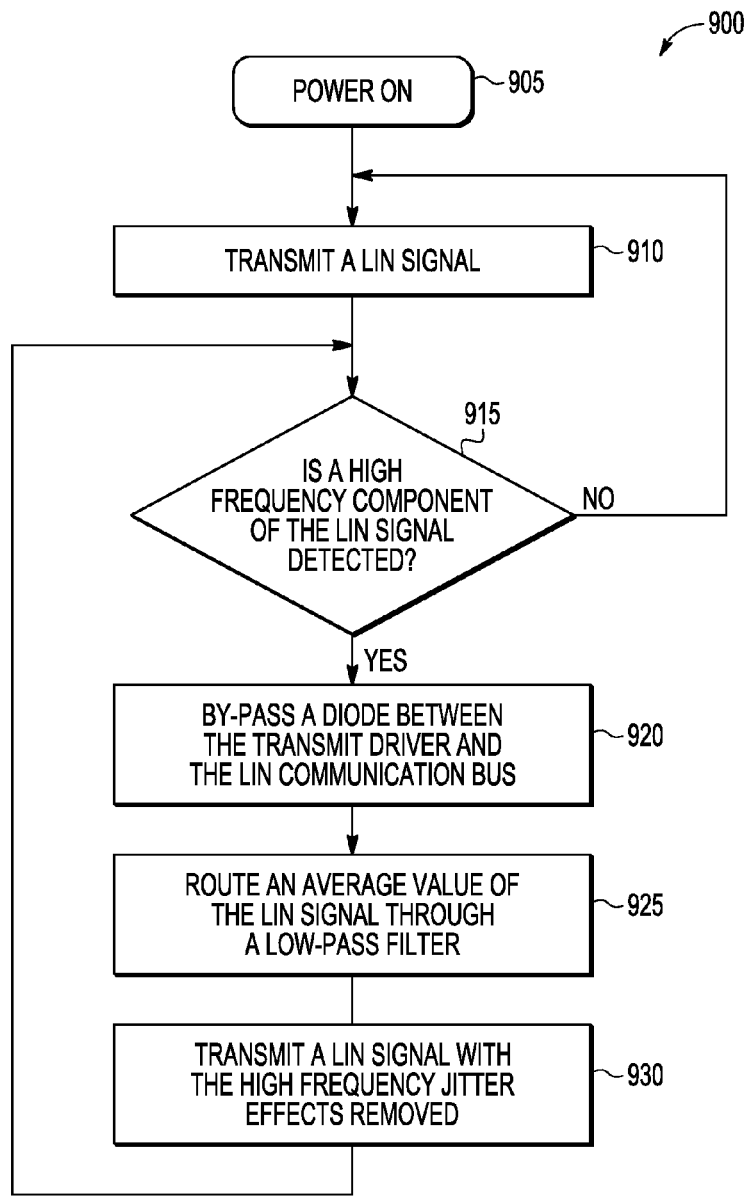

Exemplary embodiments of the present invention will now be described, by way of example only, with reference to the accompanying drawings, in which:

FIG. 4 illustrates a circuit diagram of a LIN network adapted in accordance with one embodiment of the present invention;

FIG. 5 illustrates a high frequency detector of a LIN network in accordance with one embodiment of the present invention;

FIG. 6 illustrates a test circuit used to validate a performance improvement of embodiments of the present invention;

FIG. 7 illustrates a known waveform of a signal on a LIN network that is affected by a high frequency component;

FIG. 8 illustrates an improved waveform of a signal on a LIN network when employing embodiments of the present invention; and FIG. 9 illustrates a method of operation of a LIN network in accordance with embodiments of the present invention.

DESCRIPTION OF EMBODIMENTS OF THE INVENTION

In one embodiment of the present invention, a LIN network is described that comprises a transmit driver and a receive comparator for communicating on a single communication bus. The transmit driver is operably coupled to a high frequency detector to detect a high frequency component on a low frequency signal. In response to detecting the high frequency component, the LIN network is arranged to perform one or both of the following: route the low frequency signal having a high frequency component through a low pass filter; and/or bypass the low frequency signal having a high frequency component from passing through an active device operably coupled between the transmit driver and the single communication bus.

In this manner, the provision of a bypass circuit around the active device, which is activated when a high frequency component is detected, removes a rectification effect on the low frequency signal due to the high frequency component when passed through the active device. Furthermore, the routeing of the low frequency signal having a high frequency component through a low-pass filter, when a high frequency component is detected, is designed to minimise any adverse effect on determining an accurate signal transition between a high and low voltage level due to the high frequency component.

In one embodiment of the present invention, the low frequency signal is a LIN signal and an average of the LIN signal is routed through the low pass filter to minimise any dc offset caused by the HF component.

In one embodiment of the present invention, the active device is a diode.

In one embodiment of the present invention, the transmit driver is operably coupled to a supply voltage, for example a battery voltage of a vehicle, and is configured to operate in one of at least two modes utilising one of at least two loops.

In one embodiment of the present invention, one of the at least two loops is a high frequency mode loop that is selected in response to detecting the high frequency component on the low frequency signal.

In one embodiment of the present invention, the high frequency mode loop incorporates the low pass filter when the high frequency component is detected.

In one embodiment of the present invention, the LIN network comprises a first switch (S1) arranged in parallel to the active device and operably coupled to the HF detector such that the first switch (S1) is switched to a closed position in a HF loop to bypass the active device when the high frequency component is detected.

In one embodiment of the present invention, the operation of both the first switch and the active device may be provided by a single PMOSFET, thereby simplifying the circuit.

In one embodiment of the present invention, a method of communicating on a LIN network comprising a transmit driver operably coupled to a single communication bus via an active device is described. The method comprises communicating a low frequency signal having a high frequency component on a single communication bus and detecting the high frequency component on the low frequency signal. In response to detecting the high frequency component, one or both of the following is/are performed: (i) routeing the low frequency signal having a high frequency component through a low pass filter; and/or (ii) bypassing the low frequency signal having a high frequency component signal from passing through the active device.

One embodiment of the present invention will be described in terms of a LIN network for in-vehicle communication. However, it will be appreciated by a skilled artisan that the inventive concept herein described may be embodied in any type of single-wire communication system.

In one embodiment of the present invention, the aforementioned problems are resolved by detecting a high frequency (HF) condition/mode on a LIN network. Although the invention is described with reference to a single communication line LIN communication bus 115, it is envisaged that the inventive concept is equally applicable to any single communication line system. Thus, hereinafter the term 'LIN bus' should be interpreted as meaning any single line communication bus.

In one embodiment of the present invention, the term 'high frequency' is arranged to be an order higher than a typical low frequency LIN signal. In one embodiment, the high frequency component may be in the range of 1 MHz to 1 GHz. Thereafter, when operating in a 'HF mode', i.e. after detecting when a HF component appears on a LIN signal, the LIN network is adapted to remove rectification of the LIN signal on the LIN bus caused by the HF component. An average value of the LIN voltage level is filtered and fed back to an associated amplifier loop, to dictate and clean the threshold that sets the level of transition between high and low voltage levels.

Referring now to FIG. 4, a LIN network 400 adapted in accordance with one embodiment of the present invention is illustrated. The transmit path comprises an input node 105 coupled to a shape generator 110, which provides a LIN signal shape proportional to Vbat is applied between Vbat and one port of amplifier 445.

The output of amplifier 445 is input to a base port of a FET 475, whose emitter port is fed by the supply voltage. The source port is fed to a LIN node 115. The LIN node is operably coupled to a resistor 470 in series with a diode 465 or a by-pass switch (S1) that is under operational control of high frequency diction logic 415. The input of the diode 465 is also operably coupled to the high frequency detection logic 415.

The input of the diode 465 is also operably coupled to a low pass filter 440 comprising a resistor-capacitor (R/C) network. The low pass filter 440 is operably coupled to a second switch (S2) 450 that feeds the second input port of the amplifier 445. In this manner, the second input port of amplifier 445 is either fed a filtered signal from the low pass filter 440, or a dictated by Vbat and a resistive bridge 460, 470.

A receive path comprises a receive comparator 120, the output of which is input to a receive node (rxd) 130. One input of the receive comparator 120 is provided with a battery voltage 125 arranged to be 50% of the supply voltage (Vbat). The second input of the receive amplifier 120 is isolated from ground by a capacitor 420 and coupled to the LIN bus 115 via a resistor 425.

The LIN bus 115 is also operably coupled to a FET 490 via a second diode 480. The emitter port of the FET 490 feeds a source port of FET 495, whose base port is operably coupled to a base port and a source port of FET 498.

In the circuit configuration illustrated in FIG. 4, a closed loop arrangement feeds back the average value of the LIN signal on the LIN bus 115 through a low pass filter, as soon as a high frequency (HF) signal is detected in HF detector 415 on the LIN signal.

In operation, in response to the HF detector 415 detecting a high frequency component on the LIN signal, the HF detector 415 outputs a switch control signal to close switch S1 and set switch S2 450 to the left, i.e. incorporating the low-pass filter 440. In this manner, the diode 465 is by-passed, thereby removing any signal rectification being communicated on the LIN bus. Furthermore, the average value of the LIN signal is fed back (in a closed loop manner), and passed through the low-pass (resistance-capacitor (R-C) filter to the receiver comparator 120.

With the circuit configuration in FIG. 4 set up in this manner, the signal provided to the receiver comparator 120, i.e. after passing through the R-C low-pass filter, is the average value of the LIN signal with the HF component signal substantially removed. Thus, the average value of the LIN signal at receive node 130 has almost no jitter, as shown later with respect to FIG. 8. Thus, the signals being compared at the receiver comparator 120, particularly with regard to voltage transitions being reflected on the rxd node, are substantially co-incident and therefore more accurate.

Furthermore, in operation and in response to the HF detector 415 not detecting a high frequency component on the LIN signal 115, the HF detector 415 outputs a switch control signal to open switch S1 and set switch S2 450 to the right. In this manner, the LIN signal is then passed through the diode 465 and switch S2 couples the voltage value provided by the R4 bridge 460, 470, i.e. feeding back the LIN voltage value, to the second input port of amplifier 445.

Thus, the operation of the circuit comprises the steps of:
(i) detecting an HF signal;
(ii) changing an impedance on the bus to avoid rectification. In one embodiment of the present invention, the impedance change is implemented by-passing the first diode S1 465; and
(iii) feeding back the disturbed average value to the feedback loop, incorporating the low-pass filter to minimise the effect on determining a signal transition in receiver comparator 120.

In one embodiment of the present invention, it is envisaged that the function of both the first switch and active device 465, e.g. a diode, may be provided by a single PMOSFET.

Alternatively, it is envisaged that active device 465 may be implemented as a parasitic PNP transistor with a P collector connected to ground. In such an arrangement, the transistor may be configured to take, say, 10% of the bridge current 460, 470. With such a configuration, it may be difficult to obtain sufficient accuracy due to the parasitic PNP. Thus, it is envisaged that a second resistive bridge may be used to feed back the LIN information in normal mode.

In this manner, embodiments of the present invention provide advantages over the prior art, as the prior art fails to address HF perturbations on the LIN bus 115.

Referring now to FIG. 5, a high frequency detector circuit 415 is illustrated. A capacitor C 545 is arranged to only pass a HF component of the input signal, i.e. the signal on the LIN bus 115. A resistor R 550 isolates Vgs(Mp2) from Vgs(Mp1). The HF detector is supplied by a DC 5V power supply 555. In one embodiment of the present invention, this is arranged as a floating supply due to the circuit being attached (or at least referenced) to Vbat 435.

The HF detector circuit 415 comprises a first loop, wherein the loop comprises MOSFET transistor MP1 505 and MOSFET transistor MP3 510 biasing the MOSFET transistor MP1 505 with $I_{ref}$ 515. In this manner, the Vgs of MP1 505 has a DC value. Thus, when there is no HF component on the input signal 520:

$$Vgs(Mp1)=Vgs(Mp2).$$

Thus, MOSFET transistor MP2 520 is biased with a combination of $I_{ref}$ 525+$I_{th}$ 530. In this manner, the gate port of MOSFET transistor Mn1 535 is low and the logic output is low. Thus, the output 540 from the HF detector 415 is low, signifying no HF component as being detected.

When a HF component is detected on the input signal 520, the negative part of the HF sinusoidal signal component turns on the MOSFET Mp2 520, as soon as I(Mp2) is higher than $I_{ref}$525+$I_{th}$ 530. Hence, in this manner, $I_{th}$ 530 is used to adjust the threshold of the HF detection. Thus, the larger the threshold current level of $I_{th}$ 530, the higher is the HF threshold before the HF detector circuit switches its output control signal 540 (to S1 and S2 of FIG. 4) to a HF mode of operation. MOSFET transistor Mn1 535 and capacitor C2 560 perform a function of a peak detector, arranged to keep a maximum value of the source of Mn1 535 across C2 560.

Referring now to FIG. 6, and to highlight the benefits provided by embodiments of the present invention, let us consider the improvement in the LIN circuit signals. FIG. 6 illustrates a Direct Power Injection (DPI) test circuit 600. A signal generator 655 generates a sinusoidal voltage, say a maximum of 80V peak-to-peak, and together with a 50 ohm resistor 650 represents a model of a 50 ohms output generator. The output of the generator 655 is coupled with the LIN signal through a 4.7 nF capacitor 645.

The circuit being tested 400 represents the LIN module in the vehicle. The Vbat 305, the diode 310 and the resistor 315 arrange to pull-up of the voltage value on the LIN communication bus. The second diode 480 and current source 490, 495 represent the by-pass switch function of the LIN driver, as described previously with respect to FIG. 4.

To decrease the parasitic effects of a HF component on the LIN communication bus, a capacitor 635 is connected between the LIN communication bus and ground. Due to the coupling capacitor 645, a HF signal is superimposed on the low frequency (say of the order of 10 KHz) LIN signal.

Referring now to FIG. 7, a waveform 700 illustrates the problems caused by a HF component 710 on the prior art LIN communication bus. In particular, FIG. 7 shows the effect of both rectification due to both diodes 310 and 790. The average value of the sinusoidal voltage is highlighted as dotted line 705. Due to rectification of diode D1 310, the sinusoidal HF component 710, which comprises a low frequency LIN signal and a high frequency component that have been rectified, is shifted over Vbat 305 when a (clean) LIN signal 730 would be deemed at a high level. Due to rectification of diode D2 790 the sinusoidal HF component 710 is also notably shifted below 'ground' when the LIN signal is at low DC level.

Due to this shifted DC value, in response to a slow transition, the average value of sinusoidal voltage (705) no longer follows the LIN signal closely enough. Effectively, the LIN receiver compares the LIN average value as it crosses the 50% threshold of Vbat 720. Thus, due to the signal rectification, the input to the receiver comparator 120 is shifted 740. This results in a failure of the LIN receiver to output a signal transition within the stipulated mask 735 of +/−7 μsec.

Referring now to FIG. 8, a waveform 800 illustrates the performance improvement provided by embodiments of the present invention. The same HF component 805 is shown on the average value of the LIN signal 815. However, in this case FIG. 8 shows the improvement in reducing the jitter on rxd output. In this case, the diode (diode 465 of FIG. 4) has been by-passed, leaving the output stage only coupled to diode D2 490. As there is no longer a diode located between the LIN communication bus and Vbat 435, there is no rectification of the LIN signal. The low pass filter 440 therefore takes the average value of sinusoidal voltage on the LIN communication bus through the bridge resistor network 820. The low pass filter voltage 825 is fed back to amplifier 445, which then drives the current source 530 and pulls down the current on the LIN bus through the diode D2 490. The low pass filter voltage 825 is forced by the closed loop nature of the circuit to be the same as the reference signal 830 on amplifier 445. Due to this closed loop effect, the average value 815 of the sinusoidal voltage 805 of the HF component is matched with the desired LIN signal value without any HF component 830. Hence, the jitter 840 on rxd is minimised.

Referring now to FIG. 9, a flowchart 900 illustrates one embodiment of the present invention with regard to operating a LIN network. The process commences with the LIN network being powered on in step 905. At least one LIN signal is then transmitted on the single LIN communication bus, as in step 910. A determination is then made as to whether the LIN transmission includes a high frequency component, as shown in step 915. If it is determined that the LIN transmission does not include a high frequency component in step 915, the process continuously loops to step 910.

However, if it is determined that the LIN transmission includes a high frequency component in step 915, an active device, such as a diode, located between the LIN transmit driver and the LIN bus, is by-passed in step 920. Furthermore, in one embodiment of the present invention, an average value of the LIN signal is passed through a low-pass filter before being applied to the receiver comparator, as shown in step 925. In this manner, the LIN transmission has now had the effects of the high frequency component removed from it, as shown in step 930. The process loops back to step 915 until a high frequency component is no longer detected.

It will be understood that the improved LIN network and method of operation therefor, as described above, aims to provide one or more of the following advantages:
(i) A LIN driver can be designed to comply with the LIN specification even though HF components may interfere with the LIN communication bus;
(ii) The impedance on the LIN bus can be re-arranged to ensure there is no rectification when HF perturbation is detected.
(iii) Jitter on the receiver path is significantly reduced.

In particular, it is envisaged that the aforementioned inventive concept can be applied by a semiconductor manufacturer to any single communication line circuit. It is further envisaged that, for example, a semiconductor manufacturer may employ the inventive concept in a design of a stand-alone device, such as a LIN driver, or application-specific integrated circuit (ASIC) and/or any other sub-system element.

It will be appreciated that any suitable distribution of functionality between different functional units may be used without detracting from the inventive concept herein described. Hence, references to specific functional devices or elements are only to be seen as references to suitable means for providing the described functionality, rather than indicative of a strict logical or physical structure or organization.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

In particular, it is envisaged that the aforementioned inventive concept can be applied by a semiconductor manufacturer to any integrated circuit capable of operating in a single communication bus. It is further envisaged that, for example, a semiconductor manufacturer may employ the inventive concept in a design of a stand-alone device or application-specific integrated circuit (ASIC) and/or any other sub-system element.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

Thus, an improved LIN network and method of operation therefor have been described, wherein the aforementioned disadvantages with prior art arrangements have been substantially alleviated.

The invention claimed is:

1. A linear interconnect networking (LIN) network comprising:
a transmit driver and a receive comparator for communicating on a single communication bus, wherein the transmit driver is operably coupled to a high frequency detector to detect a high frequency component on a low frequency LIN signal and in response to the detection of the high frequency the LIN network is arranged to perform one or both of the following:
route an average of the low frequency LIN signal having the high frequency component through a low pass filter; and
bypass the low frequency LIN signal having the high frequency component signal from being passed through an active device operably coupled between the transmit driver and the single communication bus; and
a first switch arranged in parallel to the active device and operably coupled to the high frequency detector such that the first switch is switched to a closed position in a high frequency loop to bypass the active device when the high frequency component is detected.

2. The LIN network of claim 1 wherein the active device is a diode.

3. The LIN network of claim 1, wherein an output of the high frequency detector configures the LIN network to bypass the active device thereby removing a rectification effect on the low frequency LIN signal caused by the active device due to the high frequency component.

4. The LIN network of claim 1 further characterised in that the transmit driver is configured to operate in one of at least two modes utilising one of at least two loops.

5. The LIN network of claim 4 wherein one of the at least two loops is a high frequency mode loop that is selected in response to the detection of the high frequency component on the low frequency LIN signal.

6. The LIN network of claim 4 wherein the the one of the at least two loops incorporates the low pass filter when the high frequency component is detected.

7. The LIN network of claim 1 wherein a function of both the first switch and the active device is provided by a single PMOSFET.

8. The LIN network of claim 1, a receiver node that receives a fed back average of the low frequency LIN signal and compares the fed back average of the low frequency LIN signal with a threshold voltage" to —The LIN network of claim 1, comprising a receiver node that receives a fed back average of the low frequency LIN signal and compares the fed back average of the low frequency LIN signal with a threshold voltage.

9. An integrated circuit for use in a linear interconnect networking (LIN) network comprising:
   a transmit driver and a receive comparator for communicating on a single communication bus, the transmit driver operably coupled to a high frequency detector to detect a high frequency component on a low frequency LIN signal, and in response to the detection of the high frequency component the integrated circuit is arranged to perform one or both of the following:
      route an average of the low frequency LIN signal having the high frequency componet through a low pass filter; and
      bypass the low frequency LIN signal having the high frequency component signal from being passed through an active device operably coupled between the transmit driver and the single communication bus; and
   a first switch arranged in parallel to the active device and operably coupled to the high frequency detector such that the first switch is switched to a closed position in a high frequency loop to bypass the active device when the high frequency component is detected.

10. The integrated circuit of claim 9 wherein the active device is a diode.

11. The integrated circuit of claim 9 wherein an output of the high frequency detector configures the integrated circuit to bypass the active device thereby removing a rectification effect on the LIN low frequency signal caused by the active device due to the high frequency component.

12. The integrated circuit of claim 9, wherein the transmit driver is configured to operate in one of at least two modes utilising one of at least two loops.

13. The integrated circuit of claim 12 wherein the one of the at least two loops is a high frequency mode loop that is selected in response to the detection of the high frequency component on the low frequency LIN signal.

14. The integrated circuit of claim 12 wherein the one of the at least two loops incorporates the low pass filter when the high frequency component is detected.

15. An integrated circuit for use in a linear interconnect networking (LIN) network comprising:
   a transmit driver and a receive comparator for communicating on a single communication bus, the transmit driver operably coupled to a high frequency detector to detect a high frequency component on a low frequency LIN signal, and in response to the detection of the high frequency component the integrated circuit is arranged to perform one or both of the following;
      route an average of the low frequency LIN signal having the high frequency component through a low pass filter; and
      bypass the low frequency LIN signal having the high frequency component signal from being passed through an active device operably coupled between the transmit driver and the single communication bus; and
   a receiver node that receives a fed back average of the low frequency LIN signal and compares the fed back average of the low frequency LIN signal with a threshold voltage.

16. A method of communication on a linear interconnect networking (LIN) network cormprising a transmit driver operably coupled to a single communication bus via an active device, the method comprising:
   communicating a low frequency LIN signal having a high frequency component on a single communication bus:
   detecting the high frequency component on the low frequency LIN signal;
   in response to detecting, performing one or both of the following:
      routing an average of the low frequency LIN signal having the high frequency component through a low pass filter; and
      bypassing the low frequency LIN signal having the high frequency component signal from passing through the active device;
   switching a first switch to a closed position in a high frequency loop when the high frequency component is detected, wherein the first switch is arranged in parallel to the active device and operably coupled to the high frequency detector; and
   bypassing the active device in response to the first switch being switched to the closed position.

17. The method of claim 16 further comprising:
   configuring the LIN network to bypass the active device to remove a rectification effect caused by the active device.

18. The method of claim 16 further comprising:
   routing the low frequency LIN signal having the high frequency component through a high frequency mode loop selected in response to detecting the high frequency component.

* * * * *

UNITED STATES PATENT AND TRADEMARK OFFICE
CERTIFICATE OF CORRECTION

PATENT NO. : 8,508,282 B2
APPLICATION NO. : 12/278484
DATED : August 13, 2013
INVENTOR(S) : Thierry Sicard It is certified that error appears in the above-identified patent and that said Letters Patent is hereby corrected as shown below:

In the Claims

At Column 9, Lines 1-8, please change:

"8. The LIN network of claim 1, a receiver node that receives a fed back average of the low frequency LIN signal and compares the fed back average of the low frequency LIN signal with a threshold voltage" to __ The LIN network of claim 1, comprising a receiver node that receives a fed back average of the low frequency LIN signal and compares the fed back average of the low frequency LIN signal with a threshold voltage." to be
-- 8. The LIN network of claim 1, comprising a receiver node that receives a fed back average of the low frequency LIN signal and compares the fed back average of the low frequency LIN signal with a threshold voltage. --

Signed and Sealed this
Twenty-ninth Day of July, 2014

Michelle K. Lee
*Deputy Director of the United States Patent and Trademark Office*